March 17, 1964 R. M. STEWART ETAL 3,125,683

PHOTOSENSITIVE DATA CORRELATION APPARATUS

Filed May 4, 1959 2 Sheets-Sheet 1

FRANK W LEHAN
ROBERT M. STEWART
INVENTORS

BY Allen E. Botney

ATTORNEY

PHOTOSENSITIVE DATA CORRELATION APPARATUS

Filed May 4, 1959 2 Sheets-Sheet 2

FRANK W. LEHAN
ROBERT M. STEWART
INVENTORS

BY Allen E. Botney

ATTORNEY

United States Patent Office 3,125,683

Patented Mar. 17, 1964

3,125,683

PHOTOSENSITIVE DATA CORRELATION APPARATUS

Robert M. Stewart, Encino, and Frank W. Lehan, Glendale, Calif., assignors, by mesne assignments, to Space-General Corporation, Glendale, Calif., a corporation of California Filed May 4, 1959, Ser. No. 810,855
6 Claims. (Cl. 250—227)

The present invention relates in general to data correlation systems and more particularly to data correlation apparatus employing optical means to provide data correspondence.

In many fields, such as in the computer art for example, it is necessary to store relatively large amounts of information or data on some storage medium so that unknown data may be identified at some later time by comparing it to the stored data. This is true not only in the computer art but also in the arts of fingerprint identification, coding and decoding of messages, terrain recognition, and a host of others too numerous to completely delineate here.

In any of these arts, either of two techniques may be utilized for comparing or correlating the unknown bit of data with the bits of stored data, namely, the technique of sequentially comparing the unknown bit of data with each bit of stored data or the technique of comparing the data involved in parallel, that is to say, the unknown bit of data is simultaneously compared with all the stored bits of data. In the former instance, it will be recognized that a finite period of time is required to make the desired comparisons or, stated differently, a time delay is encountered, which it is desirable to avoid if extremely fast operation is to be obtained. Hence, of the two techniques mentioned, the latter or parallel technique is preferable. However, in order to be able to simultaneously compare all the stored data with the unknown data, each bit of such stored data must, at the present time, be electronically and/or mechanically linked in some manner with the unknown bit of data and this, it will at once be seen, significantly adds to the bulk, weight, complexity and cost of a data correlation system.

It is, therefore, an object of the present invention to provide data correlation apparatus capable of comparing large amounts of information in parallel that is nevertheless relatively inexpensive and of compact, lightweight and simple design.

It is an additional object of the present invention to provide data correlation apparatus that is able to make data comparisons at relatively high speeds.

It is a further object of the present invention to provide data correlation apparatus that employs optical means for making data comparisons.

It is another object of the present invention to provide optical data correlation apparatus for comparing an unknown bit of data with all stored bits of data with substantially no time delay.

The present invention obviates the above-mentioned and other limitations and disadvantages inherent among prior art data correlation systems by providing data correlation apparatus of an optical nature to achieve automatic and rapid identification of a single data pattern from a set of possible data patterns, such identification being made by simultaneous comparison of the pattern to be identified with all admissible patterns. According to the basic concept of the present invention, light images of the data pattern to be identified are simultaneously projected against or superimposed upon photographic film transparencies of all the stored or admissible data patterns, the greatest amount of light flux being passed through the film at the transparency where the patterns are identical.

More particularly, the image of the unknown data pattern is multiplied into a plurality of such data pattern images of the same size and number as the patterns stored in the form of transparencies on the developed photographic film. When the multiple of unknown image patterns are respectively projected against the stored transparency patterns, the level of the light flux passed at one locale on the film will recognizably exceed the flux levels at all other locales and this will indicate that the two patterns compared at that one locale are identical. Detection of a maximum flux level can be arranged by positioning a threshold device, such as a suitably biased photomultiplier detector, behind the photographic film at each locale. Other detection devices are available and may be used as well.

According to one embodiment of this invention, image multiplication is accomplished by means of optical fibers or filaments which have the ability of transmitting light from one end of the fiber to the other substantially without diminution. More specifically, if a large number of such fibers are gathered together in a bundle, an image projected on the surface or face at one end of these fibers will be reproduced on the face at the other end. By gathering the fibers together in a novel manner at the output end of the fibers, a plurality of smaller bundles and, therefore, a plurality of smaller output faces, may be produced equal in number to the number of data patterns stored as transparencies on the film negative, each small bundle including the output end of at least one fiber from each of small and equally sized areas into which the image receiving fiber face has been divided.

Stated differently, if the image receiving fiber face is divided into N areas, each area containing the input ends of K fibers, then the output ends of these same fibers may be stranded and bundled in such a manner as to produce K output faces, each output bundle or face including the output ends of N fibers, one from each of the N areas on the input surface. It will thus be seen that if an image is now projected on the onput end of the bundled fibers, K such images of reduced size will respectively be produced at the K output faces. In this manner the unknown data pattern is made available for simultaneous projection against the data patterns stored on the film.

According to another embodiment of the present invention, image multiplication is achieved by means of a system of lenses arranged as a two-dimensional mosaic. More specifically, if a plurality of objective lenses are arrayed in a plane that is properly spaced from an object plane upon which an image of the data patterns to be identified is projected, each lens will image the unknown data pattern on a separate area of an image plane whereat the photographic storage medium, namely, the aforementioned film negative, is positioned. By using an appropriate number of lenses, the unknown data pattern may be simultaneously projected upon the different data pattern transparencies on the film.

As mentioned, the optical apparatus described above in connection with the two embodiments of the present invention is capable of taking an unknown bit of data and simultaneously projecting it for comparison upon a large number of known bits of data stored as transparencies on photographic film, which is to be desired. Moreover, as will be recognized by those skilled in the art, this apparatus is compact, lightweight, and of relatively simple construction. Furthermore, it is relatively inexpensive to manufacture. Such a combination of desirable features is not to be found in the prior art.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
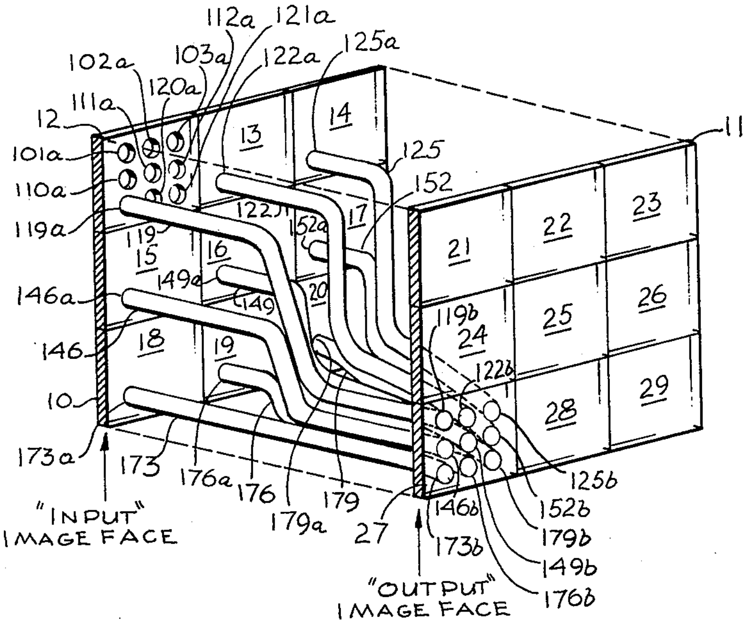
FIG. 1 illustrates one embodiment of data correlation apparatus according to the present invention.

Before referring to the drawings with particularity, it should be mentioned as background information to facilitate an understanding of the present invention that if light is shone on the end of a gloss rod, much of the light that enters is caught inside the rod, unable to escape out the sides because the angle of incidence on the walls is greater than the critical angle for total internal reflection. This light is then reflected a number of times from the walls and finally escapes from the far end. Thus, a pattern of light incident on one end of the rod is faithfully reproduced at the rod's other end.

The same phenomenon occurs when the diameter of the rod is made very small. In fact, there is no substantial change in the behavior of the rod until its diameter becomes comparable to the wavelength of light, that is, in the order of five to ten microns. Thus, for example, a glass fiber that is about twenty-five microns (0.001 inch) in diameter behaves just like the larger rod. Light is still trapped in the fiber or filament by internal reflection and carried to the far end, the only difference being that in the optical fiber there is an increase in the number of reflections per unit length.

If many such glass fibers are gathered together, for example a bundle of as many as $10^{16}$ fibers, into an orderly array, they will transmit an image by breaking it up into separate components and transmitting each of these components independently from one end of the fiber to the other. It should be clear, however, that to do so the fibers must be in exactly the same arrangement at each end or the picture will be scrambled or distorted at the exit end of the bundle, although the fibers need not be precisely arranged in the middle where the light is trapped. In one of its embodiments, the present invention involves rearranging a bundle of fibers in a novel manner such that the arrangement of the fibers at the exit end of the bundle is not the same as at the input end and in this way simultaneously producing a plurality of pictures of the image applied to the receiving end of the bundle, that is, a plurality of optical patterns corresponding to the applied image.

Referring now to FIG. 1, optical data correlation apparatus according to the present invention is shown therein which, as shown, comprises a bundle of optical fibers of the type described. To expedite and facilitate an understanding of the invention, the referred-to bundle comprises only eighty-one fibers and, to facilitate matters still further, only a portion, namely nine, of these eighty-one fibers are shown in the figure. However, it should be known that a bundle may comprise hundreds, thousands, hundreds-of-thousands, or even millions of optical fibers and that a bundle of only eighty-one fibers is presented in FIG. 1 for illustrative purposes only.

As shown, the fibers are bundled together in such a manner that their ends form two plane surfaces referred to in the figure as input image face 10 and output image face 11. Faces 10 and 11 are divided into imaginary areas which may have almost any shape and size as predetermined. Furthermore, the number of areas into which face 10 is divided need not necessarily be equal to the number of areas into which face 11 is divided. Briefly stated, the number of areas into which face 11 is divided is equal to the number of fiber ends in each area of face 10 which, in turn, is determined by the number of bits of data stored on the photographic film memory, as will be more clearly understood later.

In the figure, faces 10 and 11 are arbitrarily divided into nine substantially square areas each, and each area includes the ends of nine optical fibers. The nine areas of face 10 are respectively designated 12 through 20 and, similarly, the nine areas of face 11 are respectively designated 21 through 29. The fibers, on the other hand, are designated 101 through 181, the fiber ends included in face 10 being designated **101*a* through 181*a* and the fiber ends included in face 11 being designated 101*b* through 181*b*. Although only nine of the eighty-one fibers are actually shown, these nine are nevertheless designated according to their position in the fiber sequence. Hence, they are designated 119, 122, 125, 146, 149, 152, 173, 176 and 179. The fiber ends actually shown included in face 10 are likewise designated 101*a*, 102*a*, 103*a*; 110*a*, 111*a*, 112*a*; 119*a*, 120*a*, 121*a*; 122*a*; 125*a*; 146*a*; 149*a*; 152*a*; 173*a*; 176*a*; and 179*a*. Similarly, the fiber ends shown included in face 11 are designated 155*b*, 156*b*, 157*b*; 164*b*, 165*b*, 166*b*; and 173*b*, 174*b*, 175*b***.

Considering the apparatus of FIGURE 1 still further, in accordance with the present invention the fibers are bundled together in a novel manner such that the fiber ends in face 11 are arranged differently than the fiber ends in face 10. More particularly, fibers 101—181 are so assembled that those fibers whose ends lie in and fill a single area of face 11 are dispersed at their other ends to the extent that these other ends respectively lie in all the areas of face 10, the positions in the areas of face 10 occupied by these other ends being identical and the particular area in face 10 in which any one end lies being determined by the position the associated other end occupies in the area of face 11.

Thus, for example, optical fibers 119, 122, 125, 146, 149, 152, 173, 176 and 179 have their ends **119*b*, 122*b*, 125*b*, 146*b*, 149*b*, 152*b*, 173*b*, 176*b* and 179*b*, respectively, occupying area 27 in face 11, the delineated ends being positioned to form three horizontal rows for sake of clarity. Associated ends 119*a*, 122*a*, 125*a*, 146*a*, 149*a*, 152*a*, 173*a*, 176*a* and 179*a*, however, do not lie in or occupy any one area of face 10 but, instead, these ends lie in areas 12—20 inclusive, one end in each area. Hence, end 119*a* lies in area 12, end 122*a* in area 13, end 125*a* in area 14, end 146*a* in area 15, etc., end 179*a* lying in area 20. It will also be noticed from the figure that the relative positions of the ends in area 27 of face 11 are maintained by the associated other ends in face 10. Thus, for example, looking from left to right, ends 119*b*, 122*b* and 125*b* lie in a row in face 11 and, similarly, looking from left to right, ends 119*a*, 122*a* and 125*a* lie in a row in face 10**. The same is true with respect to the other ends discussed.

Furthermore, it will be recognized that if areas 12—20 of face 10 are made small enough, the component of light transmitted to face 11 by any one optical fiber will correspond closely to the light incident upon the associated area of face 10. In the figure, for example, the components of light transmitted to area 27 of face 11 by fibers 119, 122, 125, 146, 149, 152, 173, 176 and 179 correspond closely to the light respectively incident upon areas 12—20. As a result, any image or light pattern projected on face 10 will be reproduced in miniature on area 27 of face 11. Since each of the other areas on face 11 are intercoupled with areas 12—20 on face 10 in the same manner as area 27, it will be seen that miniature reproductions will appear on all areas of face 11 of images or patterns of light projected on face 10 and, furthermore, that these reproductions will occur simultaneously.

It was previously mentioned that the optical apparatus of FIG. 1 was used for illustrative purposes only. Thus, if an output image face (face 11 in FIG. 1) includes enough areas, a sufficient number of images will be projected on the output face to simultaneously compare an unknown image pattern representing a bit of data with all the transparencies recorded on a photographic film representing known stored bits of data. As a matter of fact, in view of the small diameters possible for optical fibers of the type described, as many as $10^6$ fibers can, for example, be bundled together so that a local input area of $10^3$ fibers is connected to every local output area of $10^3$ local output area, each local output area thereby also being made up of $10^3$ fibers. It is readily seen, therefore, that the apparatus of the present invention makes it possible to compare a large amount of stored data with an unknown bit of data without being complex, bulky, heavy or expensive.

Figure 2:
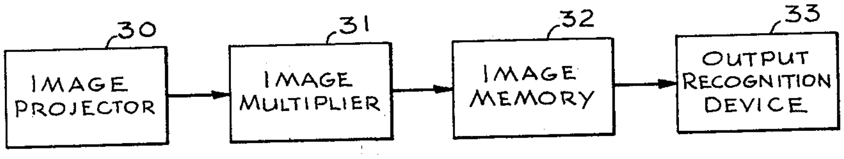
FIG. 2 is a block diagram of a data correlation system according to the present invention.

Referring now to FIG. 2, there is shown a data correlation system according to the present invention and, as shown, the system comprises an image projector 30, an image multiplier 31, an image memory 32 and an output recognition device 33 connected in tandem. Image projector 30 may be, as its name implies, any apparatus capable of projecting a light image, such as a television or radar system, an oscilloscope, or even a movie projector. Image multiplier 31 is optical apparatus of the type shown in FIG. 1 and previously described in detail. Image memory 32 is an information or data storage medium and, in view of the optical nature of the present invention, is preferably a photographic film negative upon which the data is stored in the form of transparencies. Finally, output recognition device 33 is any device or combination of devices capable of distinguishing between different light flux levels. Hence, output recognition device 33 may be a threshold device comprising a plurality of suitably biased photo multiplier detectors equal in number to the number of transparencies on the photographic film, one such detector being positioned behind each transparency. On the other hand, device 33 may be a scanning device which sequentially or serially scans the output from each film transparency for determining at which such transparency the greatest amount of light flux is passed through.

In operation, when a light image representing a bit of data, such as a pulse pattern, a pattern of dots or a letter of the alphabet, is projected by image projector 30 onto image multiplier 31, the image is multiplied a predetermined number of times and reduced in size to substantially the size of the recorded data. The multiple of identical images are then projected against the transparencies on photographic film image memory 32 which is preferably positioned contiguous to the output face of image multiplier 31. Some light flux will pass through each transparency to output recognition device 33 but the maximum amount of light flux will be passed through that transparency only that is identical in its configuration to the image projected thereupon. Consequently, in the event output device 33 is a threshold device, then only this maximum light flux exceeds the threshold level of output device 33 so that the unknown bit of data can now be identified, as by the illumination of the legend associated with such data.

Although some uses and advantages of the present invention have already been mentioned, still another use would be that of terrain pattern recognition as an aid to inertial guidance, as where the location of a missile is to be periodically checked and corrected by means of terrain pattern recognition. It should also be mentioned in connection with the apparatus of FIG. 1 that the fiber ends in face 11 can be scrambled so that instead of the input image being reproduced, configurations different from the input image and varying from each other will be produced instead. However, if the content of an output area contains all the elements of a complete reduced image, by correspondingly scrambling the elements of the transparency, the same output results will be produced. Such scrambling of images make a large variety of stranding techniques available that require less attention to detail than that required to produce properly ordered multiple images. Even completely random mixing may produce approximately the required interlacing and may, therefore, be feasible with very large numbers of strands.

Figure 3:
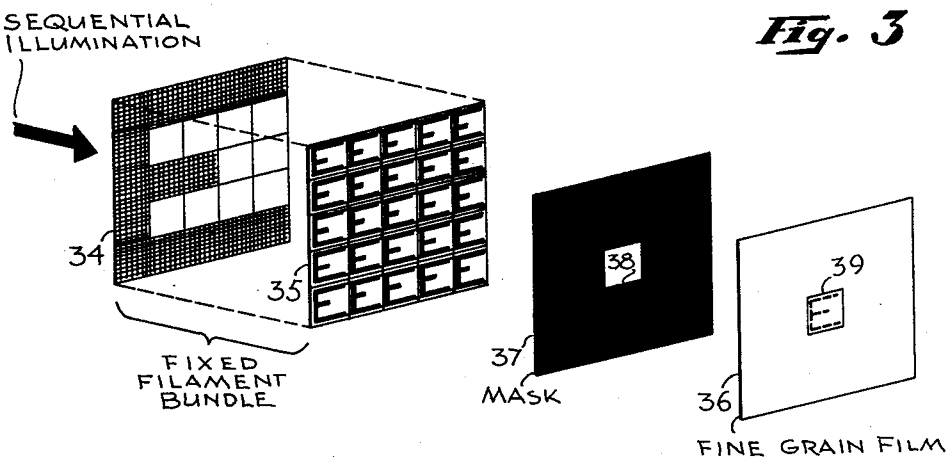
FIG. 3 illustrates apparatus and method that may be employed in producing transparencies of the data to be stored.

Several techniques are available for imprinting or recording data on a photographic film in the form of transparencies. One such technique is illustrated by the arrangement of the apparatus in FIG. 3 wherein is shown input and output image faces 34 and 35, respectively, of a fiber bundle, a photographic film 36 that is preferably of fine grain and a mask element 37 positioned between face 35 and film 36, the mask having a window 38 therethrough. The fiber bundle itself is not shown for sake of simplicity but is of the type shown in FIG. 1 and previously described. As shown in the figure, faces 34 and 35 have each been arbitrarily divided into twenty-five small square-shaped areas.

If, now, for example, a light image of the alphabet letter E is projected upon face 34, as indicated by the shaded areas thereon forming the letter E, in accordance with the present invention as embodied by the optical apparatus of FIG. 1, a miniature letter E will simultaneously appear on each and every one of the twenty-five areas of face 35. However, due to mask 37 the letter E appearing on only one of the areas on face 35 will be projected onto film 36, that one area being determined by the position of window 38 which, in turn, is controlled by the position of mask 37. Stated differently, the image on one of the areas on face 35 passes through window 38 and is projected against film 36, as indicated by the letter E in the area designated 39 on film 36. In a similar manner and by shifting the position of window 38, other letters or data can in sequence be projected against other locales or areas on film 36. By suitably processing the film, the data is then permanently recorded on the film in the form of transparencies through which light will pass.

Figure 4:
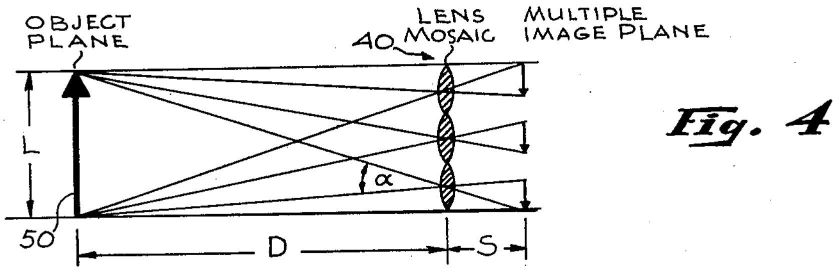
FIG. 4 is a side view of another embodiment of data correlation apparatus according to the present invention.
Figure 5:
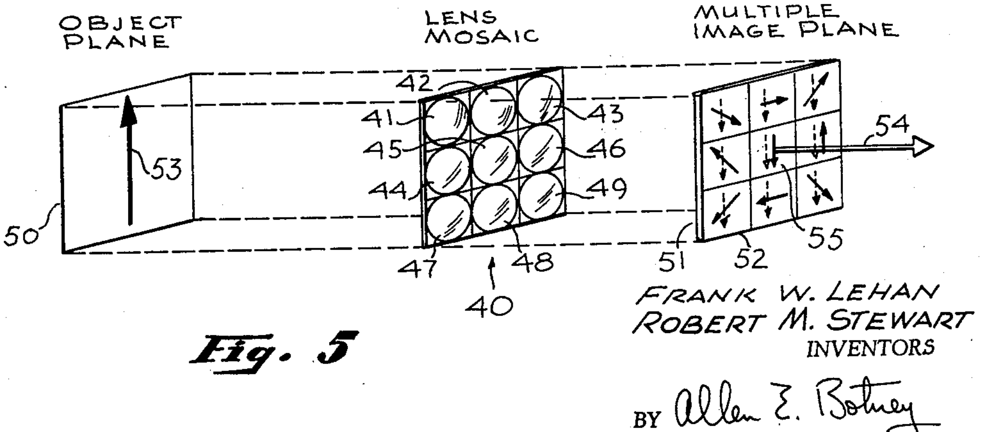
FIG. 5 is a perspective view of the embodiment of FIG. 4.

Other optical apparatus constituting an embodiment of the present invention is shown in FIGS. 4 and 5 and, as shown, the apparatus comprises a two-dimensional lens mosaic generally designated 40. For sake of clarity, a mosaic of only nine lenses is shown in the figures, but it will be understood that less than or considerably more than nine lenses may be included. The nine lenses shown in the figure are designated 41–49 and are positioned a distance "D" from an object plane 50 upon which a data light pattern may be projected. In order to avoid excessive aberration problems leading to a loss of resolution, the view angle $\alpha$ of any lens element is preferably limited to about 10°, that is, approximately 0.2 radian. Since the indicated height of the object plane is "L," then $L/D$ should approximately equal 0.2, that is, $L/D \approx 0.2$. Consequently, $D \approx 5L$ which is to say that the spacing of the lens mosaic from the object plane is preferably approximately five times the height of the object plane. Furthermore, to avoid overlapping of images, distance D is preferably $n$ times larger than the distance "S" between the lens mosaic and the image plane which is designated 51, where $n$ is the number of lenses in the mosaic. In FIGS. 4 and 5, for example, $n=9$. It will be obvious to those skilled in the art that spacing S is very nearly equal to the focal length of the lenses.

In operation, a photographic film negative 52 upon which data has been stored in the form of transparencies is positioned in image plane 51 or contiguous thereto. An image representing an unknown bit of data is then projected onto object plane 50. As a result, $n$ ($n$ is the number of lenses in mosaic 40) such images are simultaneously produced on image plane 51 with the result that these images are projected against the transparencies on film 52 and compared therewith. When the configurations of a projected image and the associated transparency are identical, the light flux passing through the transparency is a maximum and, as previously mentioned, this can be used to identify the unknown bit of data. In FIGS. 4 and 5, an arrow has been used to represent an unknown bit of data. It will be noted that when an arrow 53, oriented as shown, is projected on object plane 50, a plurality of such arrows is projected upon image plane 51 and compared with the arrow transparencies on film 52. The arrows on the image plane are shown by broken lines whereas the arrow transparencies are shown by solid lines. As indicated by arrow 54, the compared arrows are identical in only the center area designated 55, the maximum light flux passing through the transparency therein. It is thus seen that the apparatus of FIGS. 4 and 5 may be used as image multiplier 31 in the data correlation system of FIG. 2.

Having thus described the invention, what is claimed as new is:

1. A data correlation system wherein an unknown bit of data is identified by comparison with known bits of data, said system comprising: image multiplier means including a bundle of optical fibres whose ends form input and output image faces, said input and output image faces respectively being divided into first and second number of areas, said bundle of fibres including a plurality of groups of fibres equal in number to said second number of areas, each group of fibres including a plurality of fibres equal in number to said first number of areas, each group of fibres intercoupling an area in said output face with every area in said input face, the position of a fibre end in an area in said output face in relation to the other fibre ends in said area corresponding to the position of the associated intercoupled area in relation to the other areas of said input face, said image multiplier means being operable in response to a light pattern projected thereupon to simultaneously produce a predetermined number of light patterns analogous to said projected pattern, said predetermined number being equal to the number of known bits of data and wherein a light pattern projected upon said input face and transmitted therefrom by said group of fibres to said output face is reproduced on each area thereon; means for projecting a light pattern representing an unknown bit of data upon said last named means; a photographic film memory upon which the known bits of data are recorded in the form of transparencies, said film memory being positioned in such a manner that said predetermined number of light patterns are simultaneously and respectively superimposed upon said transparencies, whereby light flux of varying amounts pass through said transparencies, the maximum amount of light flux being passed whereat the transparency and the pattern superimposed thereupon are substantially identical; and output apparatus receptive of said light flux, said apparatus including means for detecting the transparency whereat the maximum amount of light flux is passed.

2. A data correlation system wherein an unknown bit of data is identified by comparison with known bits of data, said system comprising: image multiplier means including a bundle of optical fibres whose ends form input and output image faces, said input face being divided into a predetermined number of areas having equal numbers of fibre ends therein and said output face being divided into a number of areas equal to the number of fibre ends in an area of said input face, said fibres being arranged in such a manner that the fibre ends in each area of said output face are coupled through the associated fibres to fibre ends in each and every area of said input face; said image multiplier means operable in response to a light pattern projected thereupon to simultaneously produce a predetermined number of light patterns analogous to said projected pattern, said predetermined number being equal to the number of known bits of data; means for projecting a light pattern representing an unknown bit of data upon said last named means; a photographic film memory upon which the known bits of data are recorded in the form of transparencies, said film memory being positioned in such a manner that said predetermined number of light patterns are simultaneously and respectively superimposed upon said transparencies, whereby light flux of varying amounts pass through said transparencies, the maximum amount of light flux being passed whereat the transparency and the pattern superimposed thereon are substantially identical; and output apparatus receptive of said light flux, said apparatus including means for detecting the transparency whereat the maximum amount of light flux is passed.

3. In an optical data correlation system, apparatus for simultaneously producing a predetermined number of light patterns in response to a light pattern applied thereto, said apparatus comprising: a bundle of optical fibers whose ends form input and output image faces, said input face being divided into a predetermined number of areas having equal numbers of fiber ends therein and said output face being divided into a number of areas equal to the number of fiber ends in each area of said input face, said fibers being arranged in such a manner that the fiber ends in each area of said output face are coupled through the associated fibers to fiber ends in each and every area of said input face, the applied light pattern being projected upon said input face and transmitted therefrom by said bundle of fibers to said output face whereat a corresponding light pattern is produced on each area of said output face.

4. In an optical data correlation system, apparatus for simultaneously producing a predetermined number of light patterns substantially identical to a light image applied thereto, said apparatus comprising: a bundle of optical fibers whose ends form input and output image faces, said input and output image faces respectively being divided into first and second numbers of areas, said bundle of fibers including a plurality of groups of fibers equal in number to said second number of areas, each group of fibers including a plurality of fibers equal in number to said first number of areas, each group of fibers intercoupling an area in said output face with every area in said input face, the position of a fiber end in an area in said output face in relation to the other fiber ends in said area corresponding to the position of the area intercoupled by the associated fiber in relation to the other areas in said input face, the applied light pattern being projected upon said input face and transmitted therefrom by said groups of fibers to said output face whereat the applied pattern is reproduced on each area thereon.

5. Data correlation apparatus for comparing an unknown bit of data represented by a light pattern with optically recorded known bits of data, said apparatus comprising: image multiplier means receptive of the light pattern and operable in response thereto to simultaneously produce a plurality of corresponding light patterns equal in number to the number of recorded bits of data; said image multiplier means including a bundle of optical fibres whose ends form input and output image faces, said input and output image faces respectively being divided into first and second numbers of areas, said bundle of fibres including a plurality of groups of fibres equal in number to said second number of areas, each group of fibres including a plurality of fibres equal in number to said first number of areas, each group of fibres intercoupling an area in said output face with every area in said input face, the position of a fibre end in an area in said output face in relation to the other fibre ends in said area corresponding to the position of the associated intercoupled area in relation to the other areas of said input face, whereupon a light pattern projected upon said input face and transmitted therefrom by said group of fibres to said output face is reproduced on each area thereon; a photographic film memory upon which the known bits of data are recorded in the form of transparencies, said film memory being positioned in such a manner that said plurality of light patterns are simultaneously and respectively superimposed upon the transparencies, whereby the light flux of varying amounts pass through said transparencies, the maximum amount of light flux being passed whereat the transparency and the light pattern superimposed thereon are substantially identical; and output means receptive of said light flux, said output means including apparatus for detecting the transparency whereat the maximum amount of light flux is passed through.

6. Data correlation apparatus for comparing an unknown bit of data represented by a light pattern with optically recorded known bits of data, said apparatus comprising: image multiplier means receptive of the light pattern and operable in response thereto to simultaneously produce a plurality of corresponding light patterns equal in number to the number of recorded bits of data; said image multiplier means including a bundle of optical fibres whose ends form input and output image faces, said input face being divided into a predetermined number of areas having equal numbers of fibre ends therein and said output face being divided into a number of areas equal to the number of fibre ends in an area of said input face, said fibre ends being arranged in such a manner that the fibre ends in each area of said output face are coupled through the associated fibres to fibre ends in each and every area of said input face, the light pattern being projected upon said input face and transmitted therefrom by said bundle of fibres to said output face whereat a corresponding light pattern is produced on each area thereof; a photographic film memory upon which the known bits of data are recorded in the form of transparencies; said film memory being positioned in such a manner that said plurality of light patterns are simultaneously and respectively superimposed upon said transparencies; whereby light flux of varying amounts pass through said transparencies; the maximum amount of light flux being passed whereat the transparency in the light pattern superimposed thereon are substantially identical; an output means receptive of said light flux, said output means including apparatus for detecting the transparency whereat the maximum amount of light flux is passed through.

References Cited in the file of this patent

UNITED STATES PATENTS

| | | |
|---|---|---|
| 1,984,004 | Wildhaber | Dec. 11, 1934 |
| 2,032,829 | Bartky | Mar. 3, 1936 |
| 2,167,107 | Dvornik | July 25, 1939 |
| 2,196,166 | Bryce | Apr. 2 ,1940 |
| 2,268,498 | Bryce | Dec. 30, 1941 |
| 2,757,865 | Toulon | Aug. 7, 1956 |
| 2,794,977 | Stoddart | June 4, 1957 |
| 2,933,246 | Rabinow | Apr. 19, 1960 |
| 2,936,607 | Nielsen | May 17, 1960 |
| 2,967,248 | Nicoll | Jan. 3, 1961 |
| 2,981,140 | Ogle | Apr. 25, 1961 |

FOREIGN PATENTS

| | | |
|---|---|---|
| 395 | Great Britain | Jan. 6, 1900 |
| 421,120 | Great Britain | Dec. 10, 1934 |
| 470,638 | Great Britain | Aug. 17, 1937 |
| 780,976 | Great Britain | Aug. 14, 1957 |